United States Patent [19]

Alderman

[11] Patent Number: 4,660,968

[45] Date of Patent: Apr. 28, 1987

[54] AUTOMATIC EXPOSURE CONTROL

[75] Inventor: Arnold J. Alderman, Coon Rapids, Minn.

[73] Assignee: Minnesota Mining and Manufacturing Company, St. Paul, Minn.

[21] Appl. No.: 721,375

[22] Filed: Apr. 9, 1985

[51] Int. Cl.[4] .............................................. G03B 27/74
[52] U.S. Cl. ........................................ 355/68; 355/69
[58] Field of Search ....................... 354/476, 479–481; 355/68, 69

[56] References Cited

U.S. PATENT DOCUMENTS

| | | | |
|---|---|---|---|
| 3,743,405 | 7/1973 | Morse et al. ............................ | 355/3 |
| 4,433,906 | 2/1984 | Nakatani et al. ................. | 355/68 X |
| 4,443,081 | 4/1984 | Suzuki ................................. | 354/479 |
| 4,509,849 | 4/1985 | Momiyama ......................... | 354/479 |
| 4,533,238 | 8/1985 | Miyazaki ............................. | 355/68 |

*Primary Examiner*—L. T. Hix
*Assistant Examiner*—D. Rutledge
*Attorney, Agent, or Firm*—Donald M. Sell; James A. Smith; Robert L. Marben

[57] ABSTRACT

An exposure control for an imaging apparatus, the apparatus producing a light image based on an image member presented to the apparatus which is directed to a light responsive member via a partially silvered mirror of the apparatus. The exposure control includes a photocell which receives light transmitted through the mirror via a condensing lens, the photocell being connected to a circuit means which produces a signal having a duration, which varies according to the resistance of the photocell. The signal is used by a portion of the circuit means for controlling the exposure of the light responsive member to the light image.

3 Claims, 2 Drawing Figures

AUTOMATIC EXPOSURE CONTROL

BACKGROUND OF THE INVENTION

The invention presented herein relates to an exposure control that is usable with imaging apparatus for controlling the amount of light energy from a light source wherein the light source is directed to an image which with optics provides a focused light image to a light responsive member and, in particular, to such an exposure control wherein a portion of the focused light image is received by a photocell, the output of which is used to adjust the on time for the light source to compensate for changes in the light source output and the image background density.

various exposure controls have been devised for imaging equipment using a photocell position to receive a portion of the light image to provide a signal that is used to alter the light exposure to which a light responsive member is subjected to compensate for changes in the light source output and the background density of the image used to produce the light image. More flexibility for placement of the photocell is provided if the photocell is not positioned within the path of the light image. It is also desirable to use a significant portion of the focused light image so a better measure of the image background density will be obtained. This latter goal is sought in various prior art arrangements by the use of more than one photocell and using an average of the responses from the photocells for control purposes. A prescan of the light image has also been used to provide a measure of the image background density for use with an exposure control. The prior art arrangements do not show how a measure of the light image for a fairly representative area of the light image can be obtained with a single photocell when a full frame exposure is used.

SUMMARY OF THE INVENTION

The invention presented herein provides an exposure control for an imaging apparatus that avoids the complexity of a prescan arrangement or a line scan exposure arrangement to provide an adequate measure of the background density for automatic exposure control. Further, the invention requires only the use of a single photocell. The invention provides an exposure control for an imaging apparatus that includes a light image producing and utilization portion having an image member receiving portion, an electrically energizable light source arranged so its light output is directed to the image member receiving portion for providing a light image when an image member is presented at such receiving portion. The light image producing and utilization portion also includes a light responsive member and an optical means, including a lens system, positioned for receiving the light image and directing it along a path for presentment as a focused image at the light responsive member. One aspect of the exposure control is the use of a mirror, which is part of the optical means, that is of the type that causes light presented to it to be reflected in part with a portion of the light transmitted through the mirror. The mirror is positioned closer to the light responsive member than to the lens system. The exposure control includes a photocell positioned for receiving light from the light image transmitted through the mirror with a condensing lens positioned between the photocell and the mirror for intercepting a portion of the light image transmitted through the mirror and directing it to the photocell. Without the condensing lens the photocell would receive only a small sampling of the light image. Circuit means is provided that is connected to the photocell for providing a signal for a time period the length of which varies according to the response of the photocell to light received via the condensing lens. The circuit means is arranged for controlling the operation of the light image producing and utilization portion of the imaging apparatus so that the time that a light image is presented to the light responsive member is determined by such signal.

In the embodiment of the invention that is to be described in detail, the signal provided according to the response of the photocell to light received via the condensing lens is arranged to control the time the light source is energized for determining the time a light image is presented to the light responsive member eliminating the need for using a shutter mechanism for control of the time a image is presented to the light responsive member.

Another aspect of the invention is the use of a crossed linear lensfilm, commonly referred to as a Fresnel lens, in a preferred embodiment of the invention to provide the condensing lens used with the photocell. The Fresnel lens is thinner and less costly than the usual form for a condensing lens. The condensing lens is an important aspect of the invention in that an area of the light image, much greater than the area of the photocell, is intercepted by the lens and applied to the photocell to provide a greater representative sampling and, therefore, a better measure of the background density of the light image than would be obtained without the condensing lens. In addition, the use of a condensing lens with the photocell allows the photocell to be positioned relative to the lens to provide a variable resistive element when establishing a signal for a desired time period for use by the circuit means.

BRIEF DESCRIPTION OF THE DRAWINGS

The novel features and advantages of the invention presented herein will be more apparent to those skilled in the art upon consideration of the following detailed description which refers to the drawings wherein.

DETAILED DESCRIPTION

Figure 1:
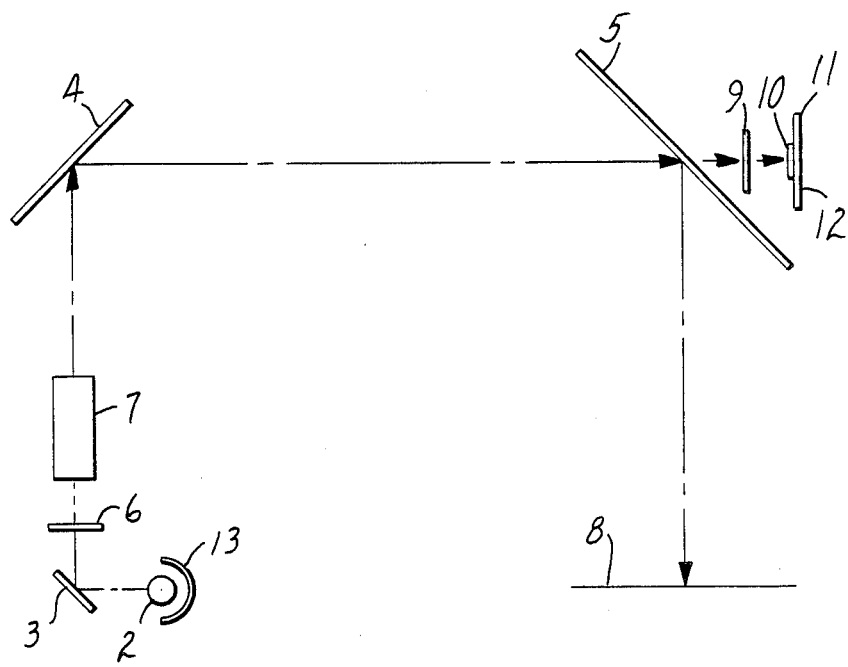
FIG. 1 is a schematic showing of the light image projection and utiilization portion of an imaging apparatus wherein the invention is embodied.

Referring to FIG. 1, a light image producing and utilization portion of an imaging apparatus is shown in schematic form and includes an electrically energizable light source 2, an optical means that includes three mirrors 3, 4 and 5, an image member receiving portion 6, and lens system 7 together with a light responsive member 8, a condensing lens 9, a photocell 10 which can be mounted on one side of a circuit board 11 with other circuitry, to which the photocell 10 is connected, mounted on the other side 12 of the circuit board. A reflector 13 is also provided which directs the light from the light source 2 to the mirror 3. Light reflected from mirror 3 passes via the image receiving portion 6 and lens system 7 to mirror 4 from which it is reflected to pass to the mirror 5. The mirror 5 is of the partially silvered type causing it to reflect a portion of the light it receives and to transmit a portion of the light it receives. As shown in FIG. 1, mirror 5 is positioned closer to the light responsive member 8 than it is to the lens system 7. The light that is reflected from mirror 5 passes to the light responsive member 8. The member 8 can take on different forms. For example, it might be a photoconductive member of the general type used in copy machines or photographic film. A particular form for the light responsive member 8 need not be specified for the invention presented herein since the invention is applicable to various types of imaging apparatus using some form of light responsive member 8 to which a light image is directed to provide a means for obtaining a copy of the light image. In addition, the processing provided subsequent to the exposure of the light responsive member 8 to a light image is not a part of the present invention and is, therefore, not described.

The light imaging producing and utilization portion of the imaging apparatus of FIG. 1 is arranged for receiving an image member, such as microfilm or microfiche. The microfilm or microfiche image member is positioned at the image member receiving portion 6 so that light from mirror 3 passes through the image member to produce a light image that is presented to the lens system 7, where it is condensed and then presented as a focused and enlarged image at the light responsive member after being reflected from mirrors 4 and 5. Lens systems providing this function are well known.

Since the background density varies for the various image members that are presented to the image member receiving portion 6 and since the light intensity output from the light source 2 changes due to various factors, it is desirable that the light exposure to which the light responsive member 8 is subjected be automatically adjusted for such changes in background density of the image member and changes in the light intensity of the light source 2. This goal is attained by the present invention by the use of the photocell 10 which is positioned to receive light from a portion of the light image that is transmitted through the mirror 5. The condensing lens 9 is positioned between the mirror 5 and the photocell 10 so that a greater portion of the light image transmitted through the mirror 5 can be presented to the photocell 10 than would be the case if a condensing lens were not used. By using the condensing lens 9, a better measure is made of the light intensity provided by the light image since a larger area of the light image is monitored by the photocell 10 than would be the case if lens 9 were not used. Further, the use of the condensing lens 9 avoids the need for using a large area photocell for receiving light from a large area of the light image. In addition, use of the type of mirror 5, which provides for transmission of a portion of the light energy directed to it, allows the photocell to be positioned outside of the path of the light image that is directed to the light responsive member 8. It is desirable, as is well known in the art, that a photocell 10 should be selected whose response to the light image is as close as possible to the response of the light responsive member 8 to the light image. Such a selection will eliminate or minimize the need to correct for differences in the light response characteristics of the photocell 10 and light responsive member 8 when the response of the photocell 10 is used to control the exposure to which the light responsive member is subjected.

Whether the photocell 10 is positioned at the focal point for the lens 9 depends on the response that is provided by the photocell 10 and its relation to elements of the control circuitry to which the photocell 10 is connected. Positioning of the photocell 10 relative to the lens 9 allows such positioning to be used as a means of varying the response provided by the photocell 10 for fine tuning the circuitry to which the photocell 10 is connected. As indicated earlier, the photocell 10 can be mounted on one side of a circuit board 11 with the circuitry to which the photocell is connected mounted on the opposite side 12 of the circuit board 11.

A condensing lens of the crossed linear lensfilm type, commonly referred to as a Fresnel lens, is preferred for the lens 9 in that it requires less space in the apparatus and is cheaper than other available condensing lenses for providing the same function.

Figure 2:
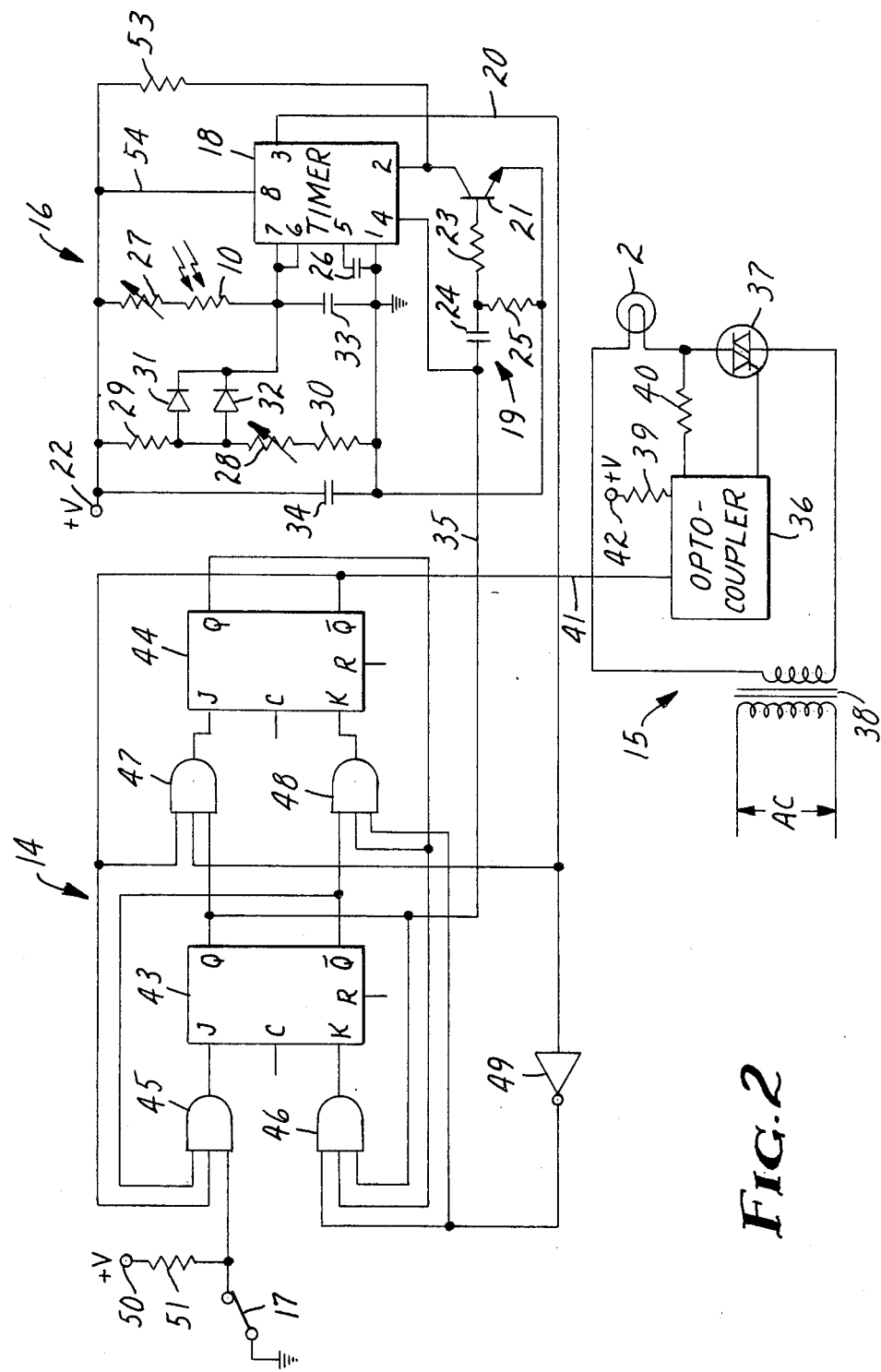
FIG. 2 is an electrical schematic of control circuitry usable with the apparatus of FIG. 1.

The photocell 10 is used as a variable element in a control circuit, such as that shown in FIG. 2, which provides a control signal that varies in duration with the response of the photocell 10 to the light it receives from the light image. The control circuit is used to establish automatic control of the exposure the light responsive member 8 receives with respect to the light image that is produced by the light imaging producing and utilization portion of an imaging apparatus, an example of which is shown in FIG. 1. Accordingly, a control circuit can be used, if the imaging apparatus has a shutter, to control operation of the shutter and thereby control exposure of the light response member 8. Exposure of the light responsive member 8 can be controlled also by varying the intensity of the light source 2, the aperture size of the lens system 7 or the on-off period of the light source 2 or any combination of such exposure parameters.

FIG. 2 is a schematic of a control circuit to which the photocell 10 is connected that provides an operator initiated control signal the duration of which varies with the response the photocell has to the portion of the light image the photocell receives. Specifically, the signal is used to control the time that the light source 2 is energized thereby providing a control of the exposure of the light responsive member 8 to the light image.

The control circuit of FIG. 2 includes a control logic circuit portion 14, a lamp control circuit portion 15 and a timed signal generator circuit portion 16.

The control logic circuit portion 14 includes a manually operated switch 17 which when momentarily operated causes the circuit portion 14 to supply an enable signal to the timed signal generator circuit portion 16 which includes an integrated circuit timer 18 and a trigger circuit 19. The trigger circuit 19 receives the enable signal and operates to supply the timer 18 with the signal needed to cause it to initiate the control signal for use in energizing the light source 2 for the duration of such control signal. The timer 18 is connected to the photocell 10 so the control signal that is provided at its output has a duration which varies according to the resistance presented by the photocell 10. The control signal is supplied via the conductor 20 to the control logic circuit portion 14, which for the duration of such control signal, supplies a signal via the conductor 41 to the lamp control circuit portion 15 to cause the light source 2 to be energized for the duration of such control signal. Referring to FIG. 1, the resistance of the photocell 10 is determined by the amount of light it receives and is used for control of the duration of the control signal. A difference in the background density of an image member from a nominal level as well as change in the intensity of the light source 2 will be reflected by a change in the resistance of the photocell 10. The photocell 10 is connected as a part of the timed signal generator circuit portion 16 in a manner so that such changes are reflected in the duration of the control signal provided on conductor 20 to provide automatic adjustment of the exposure to which the light responsive member 8 is subjected.

Considering the timed signal generator circuit portion 16 of FIG. 2 in more detail, the integrated circuit timer 18 can be provided by a type 555 timer which is available from Signetics, 811 East Arques Avenue, Sunnyvale, Calif. 94086. The numbers which are within the block of FIG. 2 representing the timer 18 correspond to the various terminal numbers used in the application literature provided by Signetics for their 555 type timer. The trigger circuit 19 of the time signal generator circuit portion 16 is connected to the trigger and reset terminals of the timer 18. The trigger circuit 19 includes a PNP type transistor 21 which has its collector connected to the trigger terminal of timer 18. The collector of transistor 21 is also connected via a resistor 53 to the positive supply voltage provided at 22. The base of the transistor 21 is coupled to the logic circuit portion 14 via a resistor 23 and capacitor 24. The common connection between capacitor 24 and resistor 23 is connected to ground via a resistor 25. One side of the capacitor 24 is connected to the control logic circuit portion 14 and to the reset terminal of timer 18. The timer 18 receives d.c. power provided at 22 via the conductor 54. The ground terminal of timer 18 is connected to ground and a capacitor 26 is provided between the control voltage terminal of circuit 18 and its ground terminal. Termination of the control signal provided on conductor 20 from timer 18 is determined by the circuitry which includes the photocell 10, adjustable resistors 27 and 28, resistors 29 and 30, diodes 31 and 32 and capacitor 33. The adjustable resistor 27, photocell 10 and capacitor 33 provide a series RC circuit that is connected between the positive voltage provided at 22 and ground. Capacitor 33 has one side connected to ground and has its other side connected to the threshold and discharge terminals of timer 18. A voltage divider is provided by the resistors 29, 30 and varible resistor 28 which are connected in series between the positive voltage provided at 22 and ground. The adjustable resistor 28 and resistor 30 provide one portion of the voltage divider with the resistor 29 providing the other portion of the divider. The resistor 29 has one end connected to the positive voltage 22. The connection common to adjustable resistor 28 and resistor 29 is connected also to the anodes of diodes 31 and 32 which have their cathodes connected to the connection that is common between the photocell 10 and capacitor 33. A filter capacitor 34 is connected in parallel with the voltage divider.

Connection of the timer 18 as described provides for monostable operation of the timer. The capacitor 33 is normally held discharged by conduction of a transistor provided within the timer 18. Upon application of a negative trigger pulse to the trigger terminal to which the collector of transistor 21 is connected, the timer 18 operates to provide a high output at the output terminal to which the conductor 20 is connected and terminates conduction of the discharge circuit provided by the timer for the capacitor 33. The capacitor 33 is allowed to charge and when it charges to the threshold voltage of the timer 18, which is two-thirds of the voltage provided at the terminal 22 for a type 555 timer, the timer 18 again provides a discharge path for the capacitor 33 and causes the output provided to the conductor 20 to return to a low state. Since the photocell 10 is connected as a part of the charging circuit for capacitor 33, the resistance provided by the photocell 10, which varies in accordance with the light energy it receives, serves to vary the duration of the high signal provided at the output terminal of timer 18. The adjustable resistor 27 provides a means for adjustment of the timing for charging the capacitor 33. The trigger circuit 19 serves to provide the negative trigger pulse to the trigger terminal of the timer 18 for initiation of the control signal at the output terminal of timer 18. The transistor 21 conducts in response to a positive signal applied to the trigger circuit via the conductor 35. Prior to the conduction of transistor 21 the trigger terminal of timer 18 which is connected to the resistor 53, is at the voltage level provided at 22. The voltage at the trigger input terminal is reduced when the transistor 21 conducts to provide the required negative trigger pulse since conduction of the transistor 21 serves to connect the trigger input terminal to ground via the transistor 21.

The voltage divider circuit portion, that has been described, is provided to supply a means for shortening the time required for the capacitor 33 to charge to the threshold voltage. The capacitor 33 receives a voltage from the voltage divider via diodes 31 and 32 for charging the capacitor 33. The voltage divider voltage becomes effective when the timer 18 is enabled. An additional voltage is supplied via the adjustable resistor 27 and photocell 10 to bring the voltage of the capacitor 33 to the threshold voltage of the timer 18 to terminate the control signal. The diodes 31 and 32 provide isolation to allow the voltage on the capacitor 33 to exceed the voltage provided to the capacitor 33 from the voltage divider. The voltage divider, with the adjustable resistor 28 at its midpoint, is arranged to provide a preset voltage to the capacitor 33 that is one-half the voltage provided at 22. The adjustable resistor 28 allows the voltage provided by the voltage divider to be adjusted to any value between 33% and 67% of the voltage provided at 22. If resistor 30 is not used as a part of the voltage divider 28, the voltage provided by the voltage divider can be adjusted to any value between 0 and 67% of the voltage provided at 22. The time provided for charging of the capacitor 33 to the threshold voltage for timer 18 is based on the production of an optimized copy from an image member presented to the image member receiving portion 6 that has a background density of 1.0 and with the adjustable resistor 28 at its midpoint. The adjustable resistor 28 thus allows the operator to adjust the duration of the control signal when image members are presented to the apparatus which differ substantially from the nominal 1.0 density.

The lamp control circuit portion 15 of FIG. 2 for the light source 2 includes an optocoupler 36, a triac 37, a transformer 38 and resistors 39 and 40. The optocoupler 36 can be of the type sold under the designation MOC 3030 that is available from Motorola Incorporated, 1303 East Algonquin Road, Schaumburg, Ill. 60196. The light emitter of optocoupler 36 has one terminal connected via the resistor 39 to the positive voltage provided at 42 with its second terminal connected to the control logic circuit portion 14 via the conductor 41. The MOC 3030 type of optocoupler includes a triac driver as a part of the light detector portion. One terminal of the light detector portion of optocoupler 36 is connected via resistor 40 to the side of the triac 37 that is connected to one terminal of the light source 2. The other terminal of the light detector portion of optocoupler 36 is connected to the gate of triac 37. The other terminal of the light source 2 is connected to one end of the secondary winding of transformer 38 which has its primary winding arranged for connection to a commercial alternating current source. The other end of the secondary winding is connected to the side of the triac 37 that is not connected to the light source 2. With the lamp control circuit portion 15, as described, a negative signal presented on conductor 41 causes the light emitter of the optocoupler 36 to be energized which in turn causes the triac 37 to conduct to energize the light source 2. A negative signal is presented when the timer 18 provides the high control signal on conductor 20 to the control logic circuit portion 14.

The control logic circuit portion 14 includes two J-K flip-flop circuits 43 and 44, four AND circuits 45-48, each having three inputs, an inverter 49, a clock (not shown), the normally closed, manually operated switch 17 having one side connected to ground with its switched contact connected directly to one input of AND circuit 45 and to the positive voltage at 50 via resistor 51. The outputs of AND circuits 45 and 47 are connected to the J-input of flip-flops 43 and 44, respectively. The outputs of AND circuits 46 are connected to the K-input of flip-flops 43 and 44, respectively. The inverter 49 receives the output of the timer 18 via the conductor 20 and has its output connected to an input of AND circuits 46 and 48. The Q output of flip-flop 44 is connected to an input of AND circuits 46 and 48. The Q output of flip-flop 43 is connected to the remaining input of AND circuit 46, one input of AND circuit 47 and also to conductor 35 for supplying the enable signal to the timed signal generator circuit portion 16. The remaining input of AND circuit 48 is connected to the $\overline{Q}$ (not Q) output of flip-flop 43. The not Q output of flip-flop 43 is also connected to one input of AND circuit 45. The not Q output of flip-flop 44 is connected to the remaining input of AND circuit 45, one input of AND circuit 47 and the conductor 41 which is connected to the optocoupler 36. The clock (not shown) is connected to the clock input, C, of each of the flip-flops 43 and 44. The reset, R, input for each of the flip-flops 43 is connected to circuitry (not shown) for receiving a reset signal each time the circuitry is connected to power to initialize the control logic circuitry.

Operation of the control logic circuitry portion 14 shall be explained from the point where power has been supplied causing the flip-flop circuits 43 and 44 to be reset so that the Q and not Q outputs of each flip-flop circuit are low and high, respectively. The light emitter of the optocoupler circuit 36 will be receiving a high signal keeping the light emitter off since the other end of the light emitter is connected to a positive voltage of the same magnitude. The timer 18 output is then low so a high signal from inverter 49 is presented to one input of AND circuit 46 with the other two inputs to the AND circuit 46 receiving low signals from the Q outputs of the two flip-flop circuits. The upper two inputs of AND circuit 45 are high since they are connected to the not Q output of the two flip-flop circuits with the third input low since it is connected to ground via the switch 17. Referring to AND circuit 47, it has a high input only at its upper input from the not Q output of flip-flop 44. The other two inputs receive low signals from the Q output of flip-flop 43 and conductor 20. The upper and lower inputs of AND circuit 48 are high being connected to the not Q output of flip-flop 46 and the output of inverter 49, respectively. Momentary opening of the switch 17 causes the output of the flip-flop 43 to change so that a high signal is present at its Q output to cause the trigger circuit 19 to provide an enable signal to the timer 18 which responds by providing a high signal to the conductor 20 and terminating the discharge path in the timer 18 for the capacitor 33 allowing capacitor 33 to charge. The AND 47 responds to the high signal from the Q output of flip-flop 43 and the high control signal on conductor 20 to present a high to the flip-flop 44 to cause the Q and not Q outputs of flip-flop 44 to present high and low signals, respectively. The low signal at the not Q output causes the optocoupler circuit 36 to operate to turn the triac 37 on to cause the light source 2 to be energized. The switch 17 will be closed when the capacitor 33 charges to the threshold voltage for timer 18 causing the output of the timer 18 to go low. With the signal on conductor 20 low, the flip-flops 43 and 44 return to their reset condition so low and high signals are presented at the Q and not Q outputs, respectively. With the not Q of flip-flop 44 presenting a high, the signal from the optocoupler 36 for causing the triac 37 to conduct is terminated to terminate energization of the light source 2. The foregoing operation is repeated when the switch 17 is again opened momentarily.

I claim:

1. An imaging apparatus having an exposure control; a light image producing and utilization portion having an image member receiving portion; an electrically energizable light source arranged so its light output is directed to the image member receiving portion for providing a light image of an image member when presented at such receiving portion; a light responsive member; and an optical means, including a lens system, arranged for receiving the light image and directing it along a path for presentment as a focused light image at the light responsive member; wherein:

the optical means includes a mirror receiving the light image that is of the type that causes light presented to it to be reflected in part over its full spectral range with a portion of the light over its full spectral range transmitted through it, said mirror positioned closer to the light responsive member than to the lens system; and the exposure control includes:
a photocell positioned for receiving light transmitted through said mirror;
a condensing lens positioned between said photocell and said mirror for intercepting a portion of the light transmitted through said mirror and directing it to said photocell; and
circuit means connected to said photocell for providing a signal for a duration of time which varies according to the response of said photocell to light received via said condensing lens, said circuit means having a portion connected for responding to said signal for controlling the operation of the light image producing and utilization portion of the imaging apparatus so the exposure of the light responsive member to the light image is determined by said signal.

2. An imaging apparatus according to claim 1 wherein said condensing lens is a crossed linear lensfilm.

3. An imaging apparatus according to claim 1 wherein said portion of said circuit means is connected to the electrically energizable light source, said portion responding to said signal to energize the electrically energizable light source for the duration of said signal.

* * * * *